United States Patent [19]
Lei

[11] Patent Number: 5,428,410
[45] Date of Patent: Jun. 27, 1995

[54] SUNGLASSES WITH INSTANT REPLACEABLE LENSES

[76] Inventor: Tony Lei, #15, Lane 30, Chung Shan 7th St., Tainan City, Taiwan

[21] Appl. No.: 953,122

[22] Filed: Sep. 29, 1992

[51] Int. Cl.⁶ .............................................. G02C 9/00
[52] U.S. Cl. ....................................... 351/47; 351/60; 351/138; 2/441
[58] Field of Search .................. 351/44, 47, 60, 103, 351/105, 110, 116, 125, 138, 140; 2/13, 441, 443

[56] References Cited

U.S. PATENT DOCUMENTS

| | | | |
|---|---|---|---|
| 1,527,237 | 2/1925 | Tully | 2/13 |
| 2,444,498 | 7/1948 | Cochran | 351/49 |
| 2,529,110 | 11/1950 | Splaine | 351/60 |
| 4,674,851 | 6/1987 | Jannard | 351/47 |
| 4,951,322 | 8/1990 | Lin | 351/44 |
| 5,182,586 | 1/1993 | Bennato | 351/47 |

FOREIGN PATENT DOCUMENTS

| | | | |
|---|---|---|---|
| 1222764 | 1/1960 | France | 351/60 |
| 0522927 | 4/1955 | Italy | 351/47 |

*Primary Examiner*—Richard A. Bertsch
*Assistant Examiner*—W. J. Wicker
*Attorney, Agent, or Firm*—Bacon & Thomas

[57] ABSTRACT

The lens of a pair of sunglasses may be quickly replaced in its associated frame by inserting the top portion of the lens within an arcuate-shaped recess of the frame and snap fitting a plurality of dowels carried by the frame into corresponding sockets formed in the lens. Notches provided on opposite sides of each dowel facilitate engagement of the dowel within the recess. A V-shaped nose bridge is also secured to a correspondingly shaped notch in the lens and prevented from removal therefrom by a pair of lugs directed inwardly from opposite edges of the notch. A nose support is secured to the bridge by inserting pegs carried by the bridge into homes formed in the support.

3 Claims, 4 Drawing Sheets

's
SUNGLASSES WITH INSTANT REPLACEABLE LENSES

FIELD OF THE INVENTION

This invention relates to a sunglasses. More particularly, a pair of sunglasses having a readily replaceable lens replaced with lenses.

BACKGROUND OF PRIOR ART

Sunglasses have widely been worn by people to prevent sun from directly shining into their eyes. Another reason for people to wear sunglasses is to have a so-called "cool" feeling. Sunglasses of the prior art, as shown in FIG. 5, generally include two lenses B permanently clamped into two recesses A1 of a frame A. The frame A has two female channels at respective opposite ends adapted to interlock with two male channels of two bows C. The lenses B are generally made from glass, which is fragile and easily damaged. When a lens becomes damaged, it is necessary to discard the entire glasses, which is impractical.

SUMMARY OF THE INVENTION

It is the primary object of the present invention to provide improved sunglasses with a readily replaceable lens.

It is another object of the present invention to provide improved sunglasses with an instant replaceable lens which is easy to assemble.

It is a further object of the present invention to provide improved sunglasses with a readily replaceable lens which complies with cost effectiveness.

It is still a further object of the present invention to provide improved sunglasses with a readily replaceable lens which is more solid.

DETAILED DESCRIPTION OF THE PREFERRED EMBODIMENT

Figure 1:
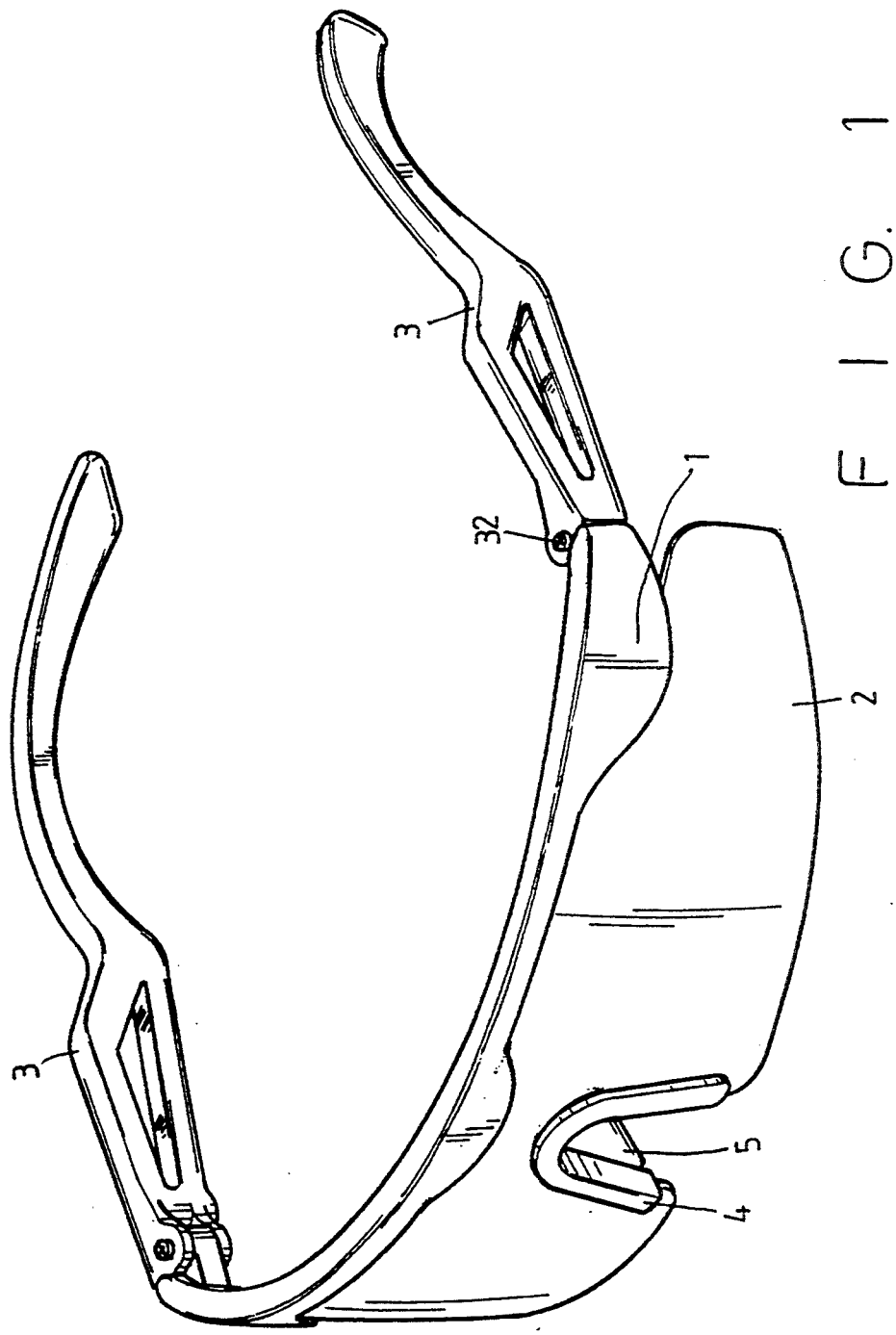
FIG. 1 is a perspective view of the present invention.
Figure 2:
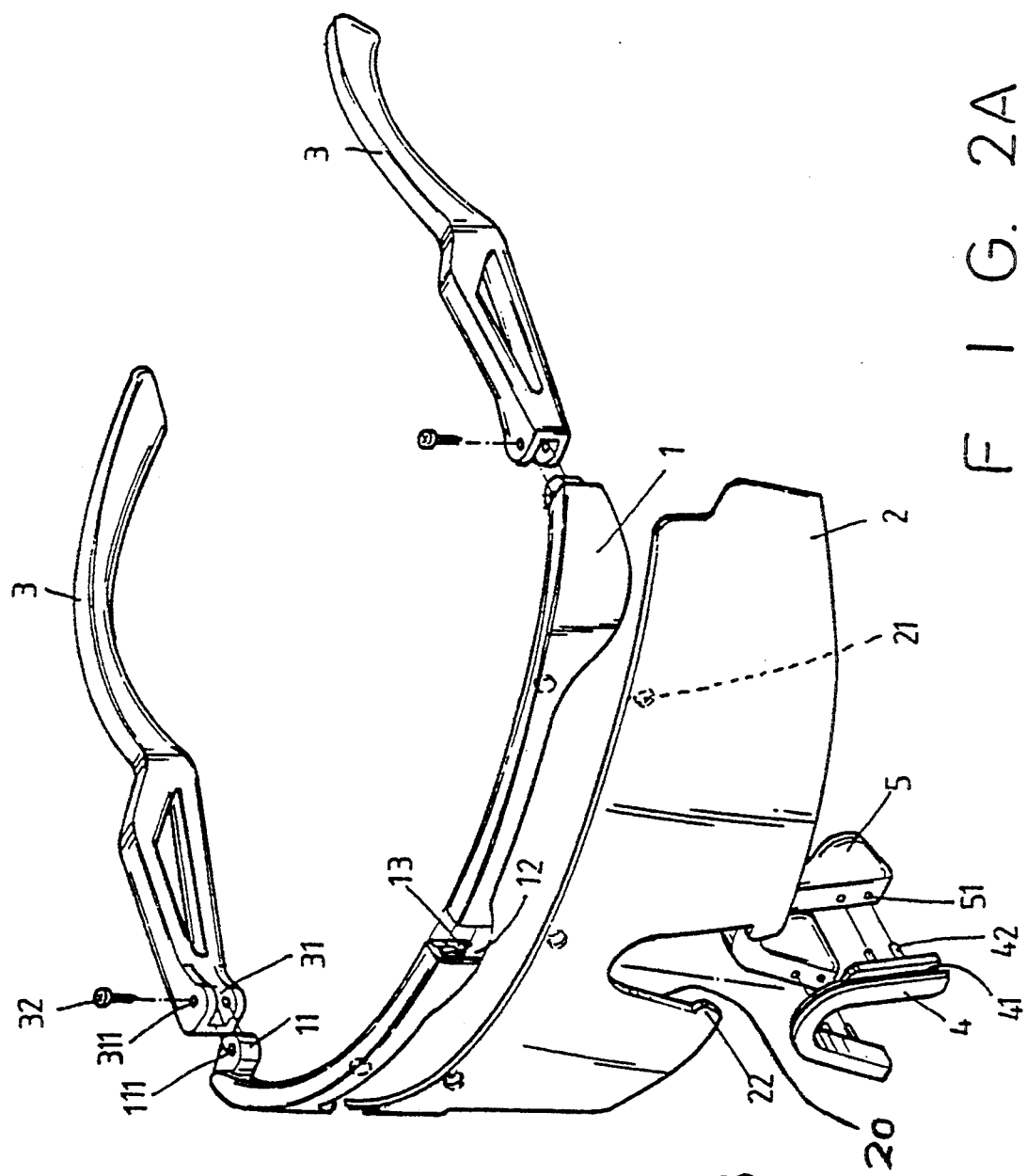
FIG. 2A is an exploded view of FIG. 1.
FIG. 2B is an enlarged view of the notch and dowel of FIG. 2A.

Reference is now made the drawings, in particular to FIGS. 1, 2A and 2B. The present invention is essentially composed of a frame 1, a lens 2, two bows 3, and a nose bridge 4.

The frame 1 is a longitudinal strip having two male projections 11 at respective opposite ends, a recess 12 extending along the length thereof and of arcuate shape in longitudinal cross-section, and provided with at least three dowels 13 equally spaced along and extending outwardly from an innerwall portion of the frame 1 into recess 12. A pair of 14 are formed at opposite sides of each dowel 13 at the innerwall portion such that the inner wall portion carrying the dowel 13 between each pair of notches 14 imparts a restoring force to dowel 13 when frame 1 is flexed to snap fit frame 1 onto lens 2.

The lens 2 has a series of dowel sockets 21 at its top inner portion coinciding in position with the dowels 13, each socket 21 being aligned with respect to each dowel 13 when the lens 2 is secured to the frame 1 by sliding the top edge of the lens 2 into the recess 12 of the frame 1. A reversed V-shaped notch 20 is formed at the center bottom portion of lens 2 to receive the nose bridge 4. Two inwardly directed lugs 22 are formed at the bottom end of the notch 20 to prevent the nose bridge 4 from slipping off.

Each bow 3 has a female channel 31 at one end to interlock with the male projections 11 of frame 1 and fastened thereto by a screw 32.

The nose bridge 4 is also of a reversed V-shape corresponding to the shape of the notch 20 of the lens 2. Bridge 4 includes a channel 41 adapted to receive notch 20. A series of pegs 42 are provided along the inner periphery of the bridge 4 and correspond in size and number with a plurality of peg holes 51 provided along the outer periphery of a nose support 5.

Figure 3:
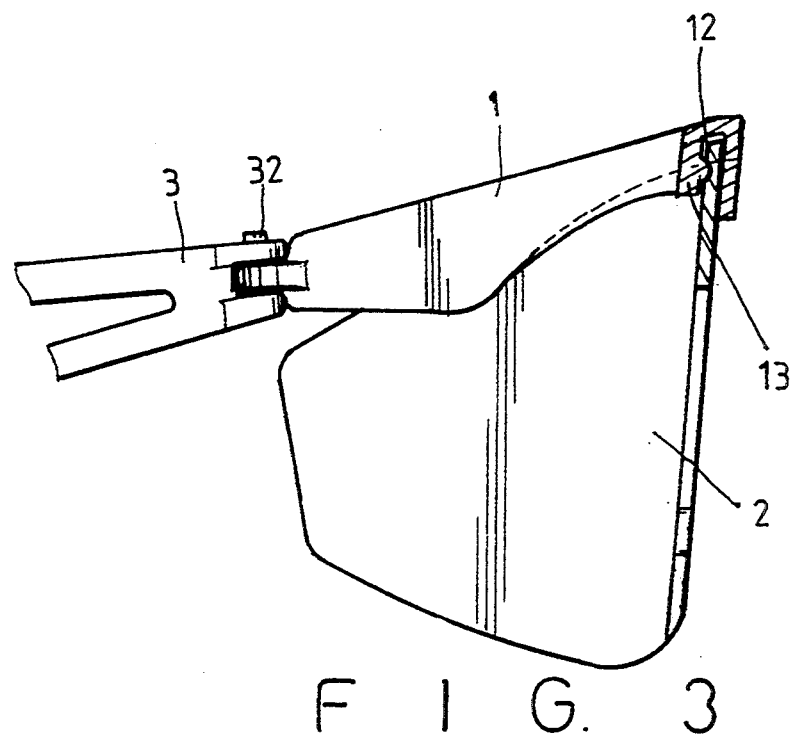
FIG. 3 is a side elevational view of FIG. 1, partially sectioned.
Figure 4:
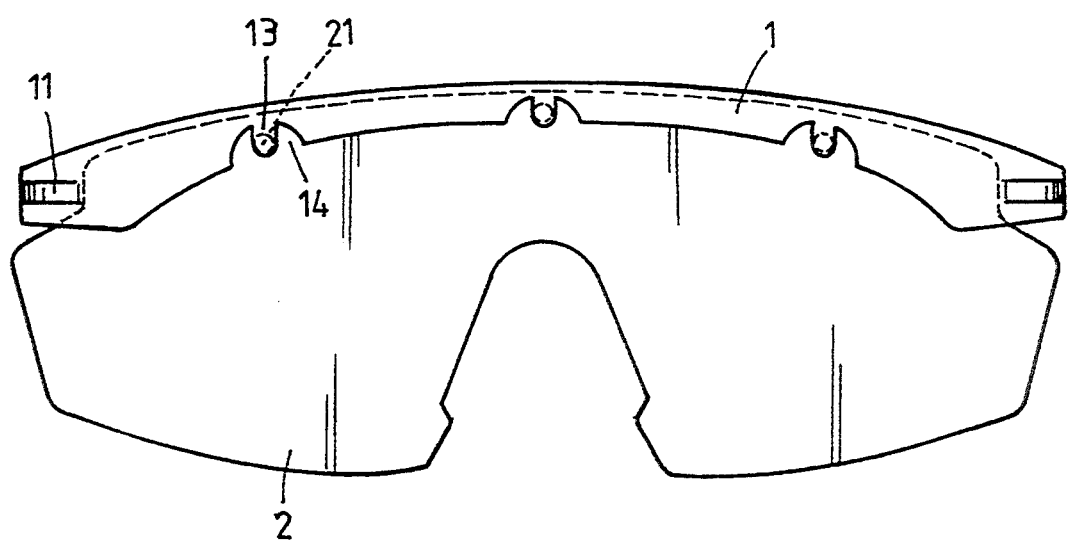
FIG. 4 is a front elevational view.
Figure 5:
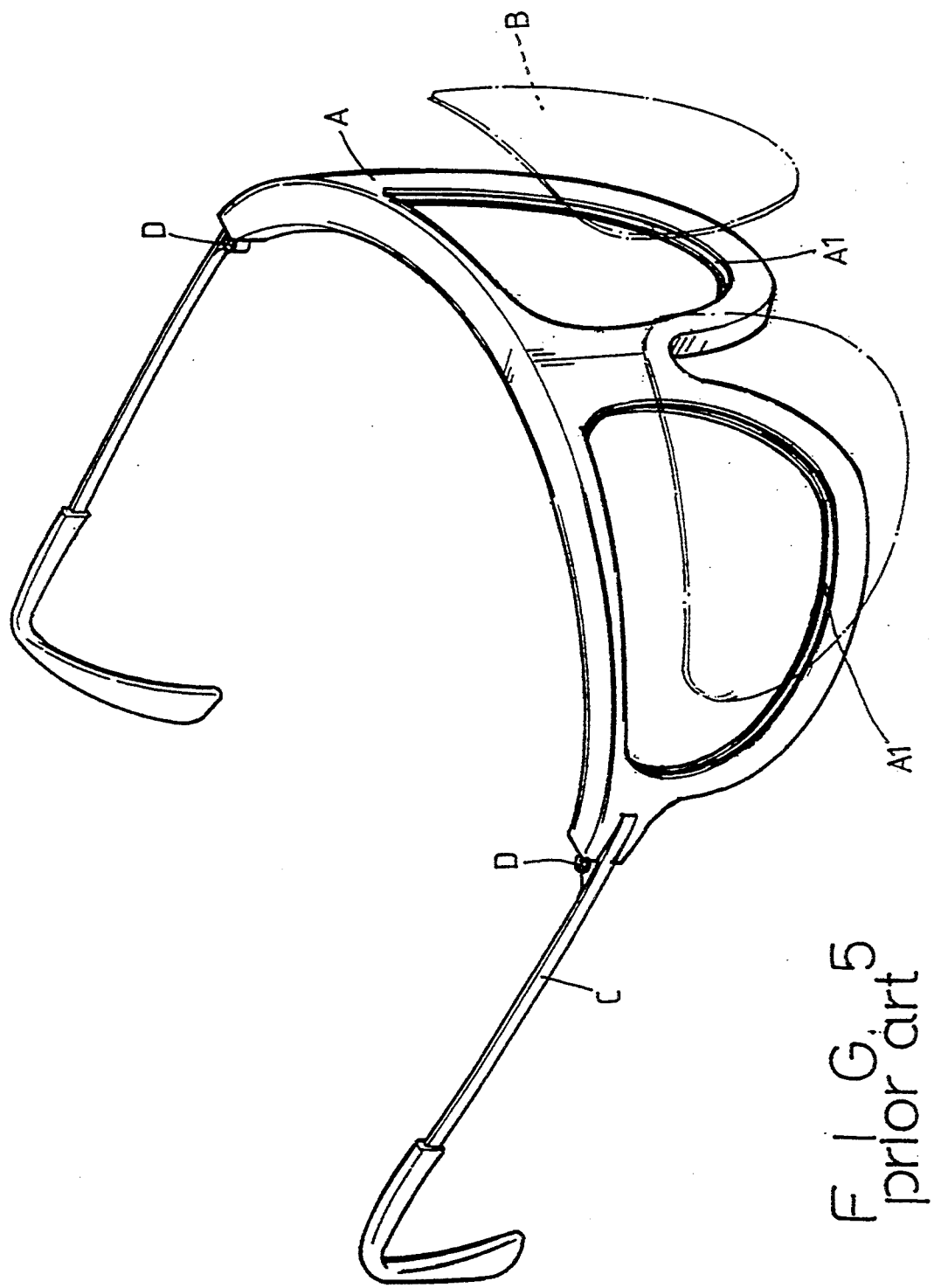
FIG. 5 is a pair of prior art sunglasses.

To assemble, the sunglasses interlock the female channels 31 and the male projections 11, as shown in FIG. 3, connect the lens 2 and the frame 1 together by pushing the lens 2 upwardly towards the recess 12 of the frame 1, whereby dowels 13 will be snap fitted into sockets 21 upon flexing of frame 1. Slide the channel 41 of the nose bridge 4 along the notch 20 until the bottom portion of the channel 41 has passed through the lugs 22. Press connect the nose support 5 to the nose bridge 4 by inserting pegs 42 into holes 51, as shown in FIG. 2A, and the present invention is completed.

While there has been described and illustrated one specific embodiment of the invention, it will be clear that variations in the details of the embodiment specifically illustrated and described may be made without departing from the spirit and scope of the invention as defined by the appended claim.

I claim:

1. A pair of sunglasses comprising:
 a) a frame including an outer wall portion, an inner wall portion, an arcuate-shaped recess partially defined by the outer and inner wall portions, a plurality of dowels carried by the inner wall portion and extending inwardly into the recess, and a pair of notches formed in the inner wall portion on opposite sides of each dowel for facilitating engagement of the dowels within the recess;
 b) a lens having a top portion engageable within the recess of the frame, the top portion being provided with a plurality of sockets formed therein; and
 c) the lens being detachably secured to the frame by flexing the frame and snap fitting the dowels into the sockets.

2. The sunglasses of claim 1 wherein:
 a) the lens includes a V-shaped notch formed therein;
 b) a V-shaped nose bridge engageable within the V-shaped notch, the nose bridge including a plurality of pegs extending therefrom; and
 c) a nose support provided with a plurality of holes formed therein, the nose support being secured to the nose bridge by engaging the pegs within the holes.

3. The sunglasses of claim 2 wherein the V-shaped notch includes a pair of inwardly directed lugs engageable by the nose bridge for securing the nose bridge to the notch.

* * * * *